United States Patent Office

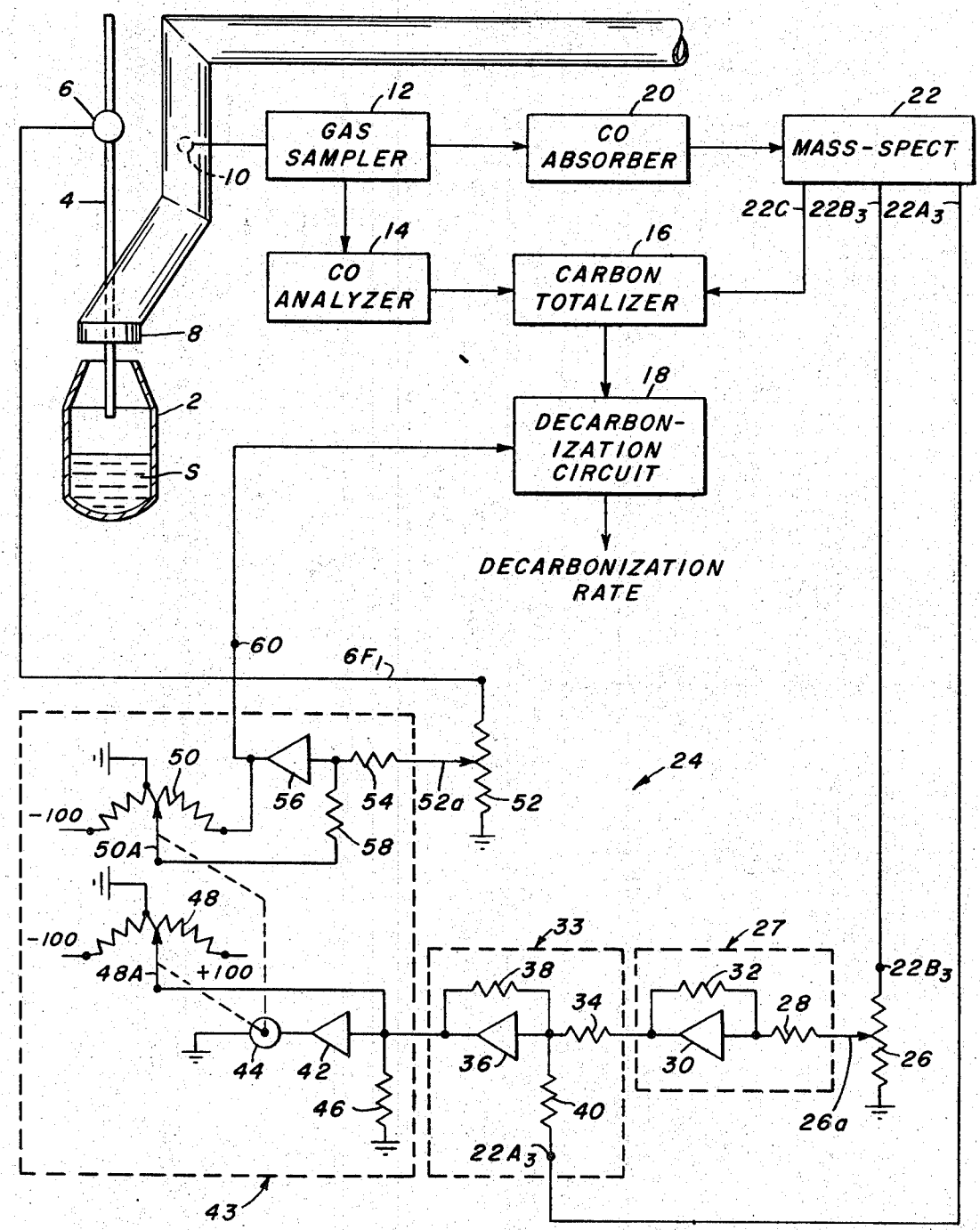

3,545,270
Patented Dec. 8, 1970

3,545,270
METHOD AND APPARATUS FOR MEASURING EFFLUENT GAS FLOW RATE
Yi-Chung Chang, Franklin Township, Westmoreland County, Pa., assignor to United States Steel Corporation, a corporation of Delaware
Filed Dec. 19, 1968, Ser. No. 785,214
Int. Cl. G01p 5/00
U.S. Cl. 73—194                                     9 Claims

ABSTRACT OF THE DISCLOSURE

In a system wherein a pair of streams unite to form a single stream and wherein a pair of streams are formed by a single stream and wherein at least two homogenously distributed components are common to and exclusively confined to each of the streams and wherein the sum of each component in the pair of streams is equal to that component in the single streams, the method of obtaining the rate of flow of one stream based upon a specific equation having as known quantities the flow rate of one of the other streams and the volumetric concentration of each of the components in each of the three streams. Apparatus for determining the flow rate of the effluent gas exiting a basic oxygen process vessel including a gas sampler, a carbon monoxide absorber, a mass spectrometer for measuring the volumetric concentrations of the component gases, and means for computing the flow rate of the effluent gas including a first multiplier, a summer assembly, a second multiplier and a divider to continuously solve the flow rate equation.

---

This invention relates to a method and apparatus for measuring the flow rate of a fluid through a conduit and more particularly to the measurement of the flow rate of the effluent gas exiting an oxygen steel making furnace or converter during decarburization of the bath. In the operation of the converter it is important to obtain the desired carbon content in the steel at the time of tapping. This end-point carbon content can be established by the continuous carbon balance method wherein the carbon leaving the furnace is continuously measured and subtracted from the original carbon content of the bath. Fillon Pat. No. 3,181,343 dated May 4, 1965 and Ohta Pat. No. 3,329,495 dated July 4, 1967 disclose the method of computing the carbon balance by determining the instantaneous decarbonization rate and integrating the carbon loss over the period in question. The decarbonization rate is computed from the product of the effluent gas flow rate and the carbon content of the effluent gas. As taught in the patents, the flow rate is determined by flow meters, but in large conduits over 6 ft. in diameter such as used in oxygen steel making, this method has an accuracy of not better than ±5%. This results in obtaining carbon analyses which are not sufficiently accurate for best operation.

In basic oxygen steel making, commercially pure oxygen containing argon and nitrogen as impurities is blown into a bath of molten metal. The carbon oxides generated by the refining reaction flow up the stack together with infiltrated air. To determine the total flow rate of the gas mixture in the stack an equation based upon the oxygen flow rate and concentration of argon and nitrogen in the entering and leaving streams is derived as follows:

Let $F_1$ equal the flow rate of the oxygen supply (in standard cubic feet per minute). $A_1$ equal the concentration of argon in the oxygen supply (in volumetric fraction), $B_1$ equal the concentration of nitrogen in the oxygen supply (in volumetric fraction), $F_2$ equal the flow rate of the air drawn into the effluent stream (in standard cubic feet per minute), $A_2$ equals the concentration of argon in the air (in volumetric fraction), $B_2$ equal the concentration of nitrogen in the air (in volumetric fraction), $F_3$ equal the flow rate of the dry effluent gas in the stack (in standard cubic feet per minute), $A_3$ equal the concentration of argon in the dry effluent gas (in volumetric fraction), and $B_3$ equal the concentration of nitrogen in the dry effluent gas (in volumetric fraction).

Then, by argon balance:

$$F_3 A_3 = F_1 A_1 + F_2 A_2 \tag{I}$$

or, since the volumetric fraction of argon in air is 0.01, then $$F_3 A_3 = F_1 A_1 + 0.01 F_2 \tag{II}$$

and by nitrogen balance:

$$F_3 B_3 = F_1 B_1 + F_2 B_2 \tag{III}$$

or, since the volumetric fraction of nitrogen in air is 0.78, then $$F_3 B_3 = F_1 B_1 + 0.78 F_2 \tag{IV}$$

Then, from (II), $$F_2 = \frac{F_3 A_3 - F_1 A_1}{0.01} \tag{V}$$

Substituting the value of $F_2$ from (V) into (IV)

$$F_3 B_3 = F_1 B_1 + \frac{0.78 (F_3 A_3 - F_1 A_1)}{0.01}$$

$$F_3 B_3 = F_1 B_1 + 78 F_3 A_3 - 78 F_1 A_1$$

$$F_3 (B_3 - 78 A_3) = F_1 (B_1 - 78 A_1)$$

$$F_3 = F_1 \frac{B_1 - 78 A_1}{(B_3 - 78 A_3)}$$

$$F_3 = F_1 \frac{\frac{B_1}{78} - A_1}{\frac{B_3}{78} - A_3} \tag{VI}$$

Concentrations of nitrogen and argon in the oxygen supply are relatively constant; so, for the purposes of measurement of the flow rate by the Equation VI in the top blowing process, a constant term K representing the term $(B_1/78 - A_1)$ may be substituted giving the flow rate equation:

$$F_3 = \frac{F_1 K}{\frac{B_3}{78} - A_3} \tag{VII}$$

It may be noted that any two measurable impurities which exist in both the oxygen supply and the dilution air may be incorporated into the Equations I and III.

It is therefore an object of my invention to provide a method of determining flow rate of gas through a conduit which is more accurate than that previously used.

Another object is to provide apparatus suitable for carrying out my improved method.

These and other objects will be more apparent after referring to the following specification and attached drawing, in which:

The single figure is a schematic drawing of my invention as applied to an oxygen steel furnace.

Referring more particularly to the drawing, reference numeral 2 indicates a basic oxygen furnace containing a metal bath of steel S supplied with oxygen by supply conduit 4 which is measured by flow meter 6 having an electrical output $6F_1$ proportional to oxygen flow. Effluent gas from the furnace 2 passes into a stack 8 having a sampling tube 10 therein for feeding effluent gas into a gas sampler 12, such as Mine Safety Appliance Company 8-2-7-1 Gas Analysis Equipment. Connected to the sampler 12 is a carbon monoxide analyzer 14 which is connected to a carbon totalizer circuit 16, which in turn is connected to a decarbonization rate circuit 18. The apparatus thus far described is conventional.

According to my invention the gas sampler 12 is connected to a carbon monoxide absorber 20 having an absorbent such as a cuprous chloride solution therein. Connected to the absorber 20 is a mass spectrometer 22, such as a Bendix Corporation Model 12–107 Time-Of-Flight Mass Spectrometer having three electrical output signals $22C$, $22B_3$ and $22A_3$. Output signal $22C$ is connected to the carbon totalizer 16. In the preferred embodiment, the output signals $22A_3$ and $22B_3$ of spectrometer 22 and signal $6F_1$ of flow meter 6 are supplied to a gas flow circuit 24 which provides a continuous solution of Equation VII above.

In circuit 24 and connected between output $22B_3$ and ground is a coefficient potentiometer 26 such as Type 2.128 of Electronics Associates, Inc., Long Branch, N.J. Connected to movable contact arm 26a of potentiometer 26 is an inverter assembly 27 being an input impedance 28 in series with a high gain amplifier 30 and a feedback impedance 32 in parallel with the amplifier 30. The output of inverter 27 is connected to a summer assembly 33 which includes an input impedance 34 connected in series with a high gain amplifier 36 and a feedback impedance 38 in parallel with the amplifier 36. An input impedance 40 connects output $22A_3$ to the summer 33 between impedance 34 and amplifier 36. The output of summer 33 is connected to servo amplifier 42 of a divider assembly 43. Servoamplifier 42 is connected in series with servomotor 44 which is connected to ground. Also connected to the input of amplifier 42 is bias impedance 46 connected also to ground. Servomotor 44 drives wiper arm 48A of a feedback potentiometer 48, the wiper arm being electrically connected to the input of amplifier 42. The coil of potentiometer 48 is center grounded and biased between 100 and −100 v. Servomotor 44 also drives wiper arm 50A of a divisor potentiometer 50. A dividend input signal from flow meter output $6F_1$ is connected through coefficient potentiometer 52 and its wiper arm 52a to input impedance 54 and high gain amplifier 56 of divider assembly 43. Divisor wiper arm 50A is connected to the dividend input between impedance 54 and amplifier 56 through impedance 58. The center grounded divisor potentiometer coil 50 is connected between the amplifier 56 output and a −100 v. bias. The output 60 of division assembly 43 provides a signal proportional to the flow rate of the effluent gases and is impressed on decarbonization circuit 18.

The high gain amplifiers 30, 36 and 56 may be Type 6.712 operational amplifier by Electronics Associates, Inc., Long Branch, N.J. and the servomultiplier 42 a Type 16–7N by the same manufacturer. In the ideal circuit proposed, all the impedances are resistors having one meg-ohm resistance to complement the 1:1 gain ratio of the amplifiers.

In operation, commercially pure oxygen containing impurities of argon and nitrogen is blown through supply tube 4 into the vessel 2 containing the bath of molten steel S. Carbon oxides are generated by the refining reaction in vessel 2 and flow up stack 8, together with air infiltrated into the system. The operation described thus far is conventional.

The effluent gas flowing in the stack 8 is sampled by the sampler 12 and a part of the sample sent to the carbon monoxide analyzer. The remainder of the gas sample is sent to the mass spectrometer 22. The output of analyzer 14 and the signal $22C$ are applied to carbon totalizer 16 as part of the decarbonization rate analysis. The spectrometer 22 generates D.C. voltages proportional to the concentrations of argon and nitrogen and these are supplied to the gas flow circuit 24, which performs an analog computing function, determining the effluent gas flow rate as a D.C. voltage. The D.C. voltage signal proportional to the nitrogen content of the effluent gas $22B_3$ is supplied to coefficient potentiometer 26 which multiplies the voltage by a constant ($1/78$ to produce an intermediate signal ($B_3/78$) which is supplied as input to inverter assembly 27. The inverter 27 changes the polarity of the input signal from positive to negative producing the signal ($-B_3/78$), which becomes one of the input signals to summer assembly 33. The D.C. voltage signal proportional to the concentration of argon in the effluent gas $22A_3$ is also supplied to the summer 33 which adds the signals algebraically and reverses the polarity of the sum to produce an output signal ($B_3/78 - A_3$) which is the divisor signal to the divider assembly 43, more particularly to servoamplifier 42 which drives servomotor 44 so as to position wipers 48A and 50A. The servo loop is completed through the wiper arm 48A as fed back to the servo amplifier 42. Thus, the wiper 48A will be positioned so that the output of the feedback potentiometer 48 will be equal to the output of summer 33, ($B_3/78 - A_3$). The position of wiper 50A will be indicative of the output of summer 33, or the divisor of the flow rate expression (VII).

The oxygen flow rate signal $6F_1$ is supplied to coefficient potentiometer 52 which multiplies the input signal by the constant K (which has a value of $B_1/78 - A_1$) producing the signal $F_1K$ which is the dividend input to divider assembly 43. The function of amplifier 56 and divisor potentiometer 50 through impedance 58 is to perform the mathematical division, taking $F_1K$ as the input dividend and $B_3/78 - A_3$ as the input divisor and producing the output signal $$\left( \frac{F_1 K}{\frac{B_3}{78} - A_3} \right)$$

If the polarity of the output needs to be reversed to give the term of Equation VII, which is the effluent gas flow rate desired to be measured, an inverter similar to 27 may be used.

The D-C signal $F_3$ at output 60 is supplied to the decarburization circuit 18 which computes the decarburization rate necessary for end-point bath carbon determination.

While my invention has been described in detail as it relates to the determination of flow rate of the gases leaving a basic oxygen steel making converter with argon and nitrogen concentrations of the oxygen, air and effluent gases being used as known or measurable factors in determining flow, my invention is not limited thereto. My invention is applicable to those situations where a pair of streams unite to form a single stream or where a pair of streams are formed from a single stream and where the flow of one stream of the pair is known or can be determined by conventional means. It is also necessary that each stream contain two components, the concentration of which are known or determinable and wherein the sum of each component in the pair of streams is equal to that component in the single stream. While most suitable for fluid streams, my invention may be used with streams of granular solid materials of uniform flow, such as powdered ore flowing through a pipe.

If the substitutions for the concentrations of argon ($A_2$) and nitrogen ($B_2$) are not made in Equations II and IV the general equation derived by similar algebra of Equations V through VI shows the flow rate to be $$F_3 = F_1 \frac{\frac{A_2}{B_2} B_1 - A_1}{\frac{A_2}{B_2} B_3 - A_3} \qquad \text{(VIII)}$$

which represents the flow situation disclosed.

It will be seen that Equation VII is the same as Equation VIII except that the fraction $1/78$ has been substituted for the term $A_2/B_2$. The terms in the two equations are the same except that they are more specifically defined in Equation VII. In Equation VIII, $F_3$ indicates the unknown flow rate of a stream to be determined, $F_1$ indicates the known or readily determinable flow rate of a second stream, $A_1$ indicates the volumetric fraction of component A in stream $F_1$, $A_3$ indicates the volumetric fraction of component A in stream $F_3$, $A_2$ indicates the volumetric fraction of component A in stream $A_2$ which is one of the pair of streams, $B_1$ indicates the volumetric fraction of component B in stream $F_1$, $B_3$ indicates the volumetric fraction of component B in stream $F_3$, and $B_2$ indicates the volumetric fraction of component B in stream $F_2$. Thus, it is seen that the apparatus disclosed can solve equation VIII merely by substituting analyzing equipment suitable for determining the volumetric fraction of the two components A and B.

A mass spectrometer which can determine nitrogen in the presence of carbon monoxide is now available from Friedrick Krupp Ness-und Analysentichink in Bremen, Germany. If this is used the carbon monoxide absorber 20 may be omitted.

While several embodiments of my invention have been shown and described, it will be apparent that other adaptations and modifications may be made.

I claim:

1. In a system wherein two homogenously distributed components are exclusively confined to three streams, a single stream of which combines generally the flow of the other pair of streams and wherein the sum of each component in the pair of streams is equal to that component in the single stream; the method of determining the rate of flow of one stream which comprises the steps of obtaining the volumetric concentration of the first component in each of the three streams, obtaining the volumetric concentration of the second component in each of the three streams, measuring the flow rate of one of the other streams, the remaining stream being one of said pair of streams, and determining the desired flow rate as a function of the volumetric concentration of the components in accordance with the equation:

$$F_3 = F_1 \frac{\frac{A_2}{B_2} B_1 - A_1}{\frac{A_2}{B_2} B_3 - A_3}$$

wherein $F_1$ is the measured flow rate, $F_3$ is the flow rate to be determined, $A_1$ is the volumetric concentration of the first component in the measured stream, $A_2$ is the volumetric concentration of the first component in the said remaining stream, $A_3$ is the volumetric concentration of the first component in the said one stream, $B_1$ is the volumetric concentration of the second component in the measured stream, $B_2$ is the volumetric concentration of the second component in the said remaining stream, and $B_3$ is the volumetric concentration of the second component in the said one stream.

2. The method of claim 1 wherein the streams are gases, the measured stream is the oxygen supply to a basic oxygen steel converter, and said remaining stream is infiltrated air, and the said one stream is the effluent gas the rate of flow of which is to be determined.

3. The method of claim 2 wherein the said homogenously distributed components common to each stream are argon and nitrogen, and the term $A_2/B_2$ in the said equation is the fraction $1/78$.

4. In a system wherein two homogenously distributed components are exclusively confined to three streams, a single stream of which combines generally the flow of the other pair of streams and wherein the sum of each component in the pair of streams is equal to that component in the single stream; apparatus for determining the rate of flow of one of said streams comprising means for obtaining a signal proportional to the flow rate of one of the other streams, means for obtaining the signals proportional to the volumetric concentration of the first component in each stream, means for obtaining signals proportional to the volumetric concentration of the second component in each stream, and means for combining the said signals according to the equation:

$$F_3 = F_1 \frac{\frac{A_2}{B_2} B_1 - A_1}{\frac{A_2}{B_2} B_3 - A_3}$$

to provide a signal proportional to the flow rate of the said one stream wherein $F_1$ is the measured flow rate, $F_3$ is the flow rate to be determined, $A_1$ is the volumetric concentration of the first component in the measured stream, $A_2$ is the volumetric concentration of the first component in the said remaining stream, $A_3$ is the volumetric concentration of the first component in the said one stream, $B_1$ is the volumetric concentration of the second component in the measured stream, $B_2$ is the volumetric concentration of the second component in the said remaining stream, and $B_3$ is the volumetric concentration of the second component in the said one stream.

5. Apparatus according to claim 4 in which the means for combining the signals comprises a first multiplier means including an input means and output means; means connected to said first multiplier input means for supplying a first multiplicand signal; inverter means including input means and output means, said input means connected to the output means of the first multiplier; summing means including a first and second input means and output means, said first input means being connected to the output means of the inverter; means for supplying to the second input means of said summing means an addend signal; a second multiplier means including input means and output means; means for supplying a second multiplicand signal to said second multiplier input means; divider means including first and second input means and output means, said first input means being connected to the output means of the summing means and the second input means being connected to the output means of the second multiplier means; and output terminal means connected to receive signals from said output means of said divider means and to provide an output indicative of the flow rate of said one stream.

6. Apparatus according to claim 5 in which the multiplier means, inverter means, adder means, and divider means are operational amplifiers.

7. Apparatus according to claim 4 in which the means for combining the signals comprises an inverter for receiving the signal proportional to the volumetric concentration of the second impurity in the said one stream, a summer connected to the output of said inverter, means connecting the signal proportional to the volumetric concentration of the first impurity in said one stream to said summer, and a division assembly connected to receive the output of said summer and the signal proportional to the flow rate of said second stream.

8. Apparatus according to claim 4 wherein the streams are gases, the measured stream is the oxygen supply to a basic oxygen steel converter, the said remaining stream is infiltrated air, and the said one stream is the effluent gas the rate of flow of which is to be determined, the first measured impurity A is argon, and the second measured impurity B is nitrogen.

9. Apparatus according to claim 8 in which the means for combining the signals comprises a coefficient potentiometer connected to receive the signal proportional to the volumetric concentration of the nitrogen in said effluent gas, and to multiply said signal by $1/78$, means having its inputs connected to said potentiometer and to the signal proportional to the volumetric concentration of the argon in said effluent gas to subtract one input from the other to provide a signal equal to $B_3/78 - A_3$, a second coefficient potentiometer connected to the signal proportional to oxygen flow, a division assembly having an input connected to the output of said last named means, and multiplying it by a constant equal to $B_1/78 - A_1$, and to the output of said second coefficient potentiometer to obtain a signal equal to $$F_1 \frac{\frac{B_1}{78} - A_1}{\frac{B_3}{78} - A_3}$$

References Cited

UNITED STATES PATENTS

| | | | |
|---|---|---|---|
| 1,299,540 | 4/1919 | Bailey | 73—194 |
| 3,181,343 | 5/1965 | Fillon | 73—23 |
| 3,400,585 | 9/1968 | Kraus et al. | 73—194 |
| 3,432,288 | 3/1969 | Ardito et al. | 73—23X |
| 3,446,073 | 5/1969 | Auphan et al. | 73—204 |

CHARLES A. RUEHL, Primary Examiner

U.S. Cl. X.R.

73—23; 235—151.34